Nov. 13, 1951  A. W. CHRIST  2,574,689
WINDING CRANK FOR CAMERAS
Filed June 10, 1949
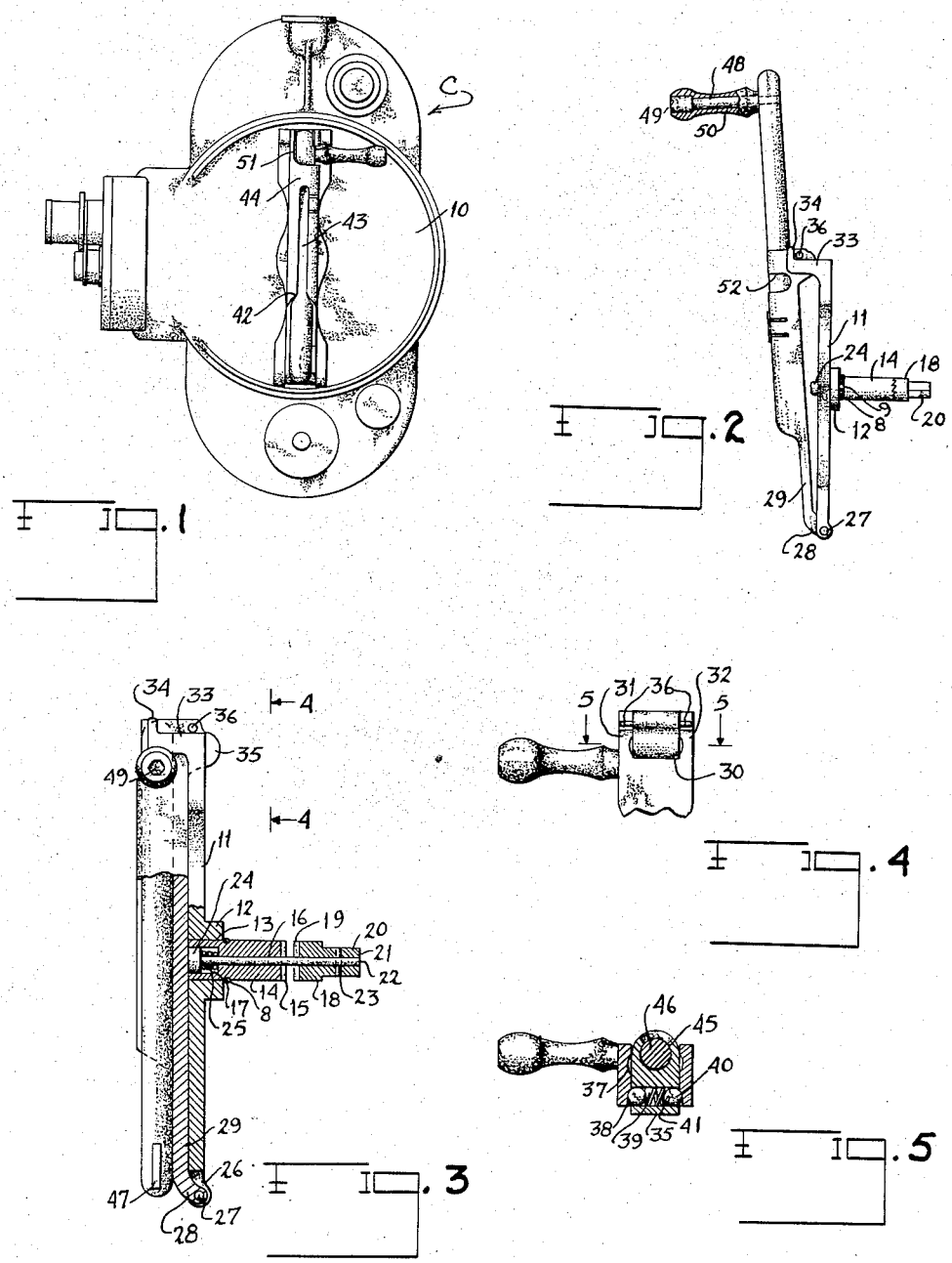
Inventor
ALFRED WILLIAM CHRIST
By Joshua R. H. Potts
His Attorney Patented Nov. 13, 1951

2,574,689

UNITED STATES PATENT OFFICE 2,574,689

WINDING CRANK FOR CAMERAS

Alfred William Christ, Chicago, Ill.

Application June 10, 1949, Serial No. 98,330

13 Claims. (Cl. 74—546)

The present invention relates to the winding cranks now employed with certain types of movie cameras for the purpose of winding an actuating spring therein to place this spring under the tension necessary for operation of the camera.

At the present time, the use of the well known sixteen millimeter movie camera is coming into widespread use. Such movie cameras are produced by several manufacturers although the present invention is concerned primarily with the movie camera produced by Bell and Howell or one that is identified as being of that type. In a sixteen millimeter movie camera of the Bell and Howell type a spring is employed as the source of power for operating the camera while pictures are being taken. Obviously, this spring must be under tension in order to provide the operating force and after continued periods of operation, the spring will run down and it is necessary from time to time to rewind the spring so as to place it under the tension necessary for operation of the camera.

At the present time, movie cameras of the Bell and Howell type include a winding key for winding the spring. This now known key consists of nothing more than a comparatively short crossbar that is adapted to be engaged by the operator's fingers and which is operatively connected to a plug which fits in a socket in the winding element of the camera with the connection including a ratchet which permits rotation of the bar in one direction without any operative effects.

While a winding key of the type above indicated performs the operation that is required of it, namely, the winding of the spring, there are many disadvantages which attend the use of this now available key. In the first place, a considerable interval of time is required to completely wind the spring of the camera. When it is considered that these cameras are very often employed in taking pictures of sport events and other scenes of action, an interval as long as twenty eight to thirty seconds, which is ordinarily required to wind a spring with the now known key, is so long as to greatly impair the ultimate result.

Then, with the now known key, the operative connection between the winding element in the camera which receives the plug of the key and the key itself is maintained intact while the camera is taking pictures. This means that the key must either be withdrawn from the camera when it is not used in winding operations or if left in position, it will slowly rotate as the camera is used. Both of these conditions are undesirable, particularly the former in that a certain amount of time is unavoidably expended in positioning the key for the winding operation.

When it is considered that movie cameras are often located at various positions with respect to the operator, the inconvenience which attends the use of the now known key is emphasized. Very often, a movie camera will be located above the operator's shoulders and it becomes extremely awkward for the operator to perform the winding operation.

With the foregoing conditions in mind, the present invention has in view as its foremost objective, the provision of a winding crank which is intended to replace the winding key now commonly employed in conjunction with sixteen millimeter movie cameras of the Bell and Howell type and which winding crank obviates the undesirable features above outlined.

An important object of the invention lies in the provision of a winding crank of the type indicated which includes an extensible arm. Under normal conditions when the crank is not used, the arm is collapsed and assumes a compact condition at the side of the camera. When its use is required, it may be quickly extended to afford a long crank arm with the attending benefits of increased leverage and mechanical advantage.

Another object of the invention is to provide, in a winding crank of the type indicated, a crank arm which consists essentially of a base element formed with a cylindrical socket which telescopically and rotatably receives an extensible element. The latter is provided with an operating member on the free end thereof. When the arm is collapsed, the extensible member may be rotated through substantially ninety degrees to bring this operating member into a compact condition in which it does not protrude outwardly. The base member and extensible member are provided with elements which interlock when the arm is extended and which prevent relative rotation between the two.

Another highly important object of the invention is to provide a winding crank of the type indicated which consists essentially of an extensible arm that is pivotally connected at one end to one end of a crossbar which carries centrally thereof means for operatively connecting same to the winding element of a movie camera. The other end of this crossbar is provided with means for limiting the relative movement between the crossbar and the extensible arm.

In accordance with the present invention, it is intended that the crank remain in position on the camera during those times in which the camera is used. In view of this object, it is necessary that the driving connection between the winding element in the camera and the crank be broken while pictures are being taken.

In view of this necessity, a further object is to provide, in a winding crank of the type indicated, means for interrupting or breaking the driving connection between the crank and the winding element when the crossbar and extensible arm are in a relatively collapsed condition.

In carrying out this idea, the usual ratchet is included in the operative connections between the crossbar and the plug which is received in the winding element of the camera. One element of this ratchet carries a pin which extends through an axial passage in the other element and projects beyond the outer face of the crossbar. The two ratchet elements are relatively movable and when the extensible arm is collapsed with respect to the crossbar it engages the projecting end of the pin to break the connection between the ratchet elements. Thus, when the extensible arm is collapsed and "snapped in" it will remain in an ineffective position on the side of the camera.

In providing a winding crank of the type indicated, it is desirable that the extensible arm definitely assume either of two positions. That is, it should either be "snapped in" or "snapped out." With this thought in mind, a further object of the invention is to provide, in a winding crank of the type indicated, means for yieldably holding the extensible arm in either its "snapped in" or "snapped out" position.

In carrying out this idea, the end of the base member of the extensible arm that is remote from its pivotal connection is provided with a pair of spring actuated ball detents which are adapted to be seated in either set of two pairs of recesses which are formed on the corresponding end of the crossbar.

Various other more detailed objects and advantages of the invention such as arise in connection with carrying out the above noted ideas in a practical embodiment will, in part become apparent, and in part be hereinafter stated as the description of the invention proceeds.

The invention therefore comprises a winding crank intended for use with sixteen millimeter movie cameras of the Bell and Howell type and which winding crank consists essentially of a crossbar which carries centrally thereof a plug that is adapted for insertion into a socket formed in the winding element of a movie camera with a breakable ratchet connection between the plug and the crossbar. Pivotally mounted on one end of the crossbar is the base member of an extensible arm. The other end of the crossbar and base member are provided with cooperating means for limiting relative pivotal movement between the two and also with cooperating elements of a yieldable detent which holds the base member in either a "snapped in" or "snapped out" position.

The base member telescopically and rotatably receives an extensible member that is adapted to either be extended into operative position or collapsed into an inoperative position. The ratchet connection aforesaid is adapted to be broken when the extensible arm is moved into its "snapped in" or collapsed position relative to the crossbar.

For a full and more complete understanding of the invention, reference may be had to the following description and accompanying drawing wherein:

Figure 1 is a view in side elevation of a sixteen millimeter movie camera of the Bell and Howell type with a winding crank which is designed in accordance with the precepts of this invention applied thereto.

Figure 2 is a view in side elevation of the crank per se with the arm in an extended position.

Figure 3 is a side view partly in section and partly in elevation showing the extensible arm as collapsed and snapped into its inoperative position.

Figure 4 is a detailed showing looking from the inner face of the crossbar when the arm is collapsed and snapped into position against the crossbar; and Figure 5 is an enlarged detailed sectional view taken about on the plane represented by the line 5—5 of Figure 4.

Referring now to the drawing wherein like reference characters denote corresponding parts, and first more particularly to Figure 1, a sixteen millimeter movie camera of the Bell and Howell type is therein depicted and referred to in its entirety by the reference character C. The camera C includes a side face at 10 against which the winding crank of this invention is intended to be operatively assembled. This side face 10 is formed with an opening through which a plug (to be later described) is adapted to pass so that it may be seated in a winding element that is included as a part of the camera C. It is this winding element which must be rotated to place the actuating spring of the camera C under the tension necessary for operation of the camera.

Referring now more particularly to Figures 2 and 3, the winding crank of this invention is shown as including a crossbar 11 which has a length somewhat less than the diameter across the circular face 10. Intermediate its ends, the crossbar 11 is formed with a central embossment or hub 12 which is in turn formed with a bore 13. A ratchet element 14 has an exposed face that is formed with a series of ratchet teeth 15 which are of the radial type. The opposite end of the element 14 is of cylindrical formation and is nonrotatably received in the bore 13. This nonrotatable connection may be achieved in any desired manner such as by a pressed fit or metallic fusion. The important thing is that there should be a driving connection between the element 14 and the crossbar 11. The element 14 is formed with a groove 9 which receives a split spring ring 8. This spring 8 holds the element 14 in position in the camera C.

The ratchet element 14 is formed with an axial passage 16 which at its inner end is enlarged with the element 14 counterbored to form a recess 16.

A second ratchet element 18 has one face formed with ratchet teeth 19 that are complemental to the teeth 15 and with which they are adapted to engage. The end of the element 18 remote from the teeth 19 is shaped to provide a noncircular plug 20 that is adapted to be received in the socket of the winding element of the camera as above mentioned to establish a driving relation between this winding element and the ratchet member 18. Any noncircular formation desired may be employed to establish this driving fit but inasmuch as the cameras now include square sockets, the plug 20 is shown as being square.

The element 18 is formed with a central bore 21 which extends through the plug 20. Received in this bore 21 is an elongated pin 22 and a driving relation between this pin and the plug 20 is established in any preferred manner such as employing the cross pin shown at 23.

The pin 22 passes through the bore 16 of the ratchet member 14 and into the recess 17. The free end of this pin 22 carries a head 24 that is slidably received in the recess 17. An expansion coil spring 25 is disposed about the pin 22 in the recess 17 and bears against the inner face of the head 24 at one end and the ratchet element 14 at the other.

Under normal conditions when no restraining force is applied to the head 24, the spring 25 will maintain the head 24 in position depicted in Figure 2 in which it projects beyond the outer face of the crossbar 11. Moreover, in this position the pin 22 draws the ratchet elements 14 and 18 together so that the teeth 15 and 19 mesh to establish, for rotation in one direction, the driving relation between these ratchet elements.

At one end, the crossbar 11 is formed with a pair of spaced ears 26 between which extend a pivot pin 27. Mounted on this pivot pin 27 is a tailpiece 28 formed on a base member 29. This base member 29 is adapted to assume a face to face engagement with the crossbar 11 as shown in Figure 3.

The end of the crossbar 11 remote from that which carries the ears 26 is formed with a recess 30 which defines a pair of legs 31 and 32 on opposite sides thereof. (See Figure 4.) Outstanding from the free ends of the legs 31 and 32 to which they are integrally joined are endpieces 33. Each of these endpieces 33 carries an outwardly projecting flange 34.

The base member 29 at the end remote from its pivotal connection to the cross bar 11 and on the face which engages this crossbar 11 is formed with an enlargement 35 which fits in the recess 30 between the legs 31 and 32 and the endpieces 33. Extending outwardly from opposite sides of the base member 29 substantially at the end thereof and beyond the enlargement 35 are cross pins 36 which engage the flanges 34 to limit the relative pivotal movement between the base member 29 and the crossbar 11.

The inner faces of the endpieces 33 adjacent to the outer ends of the latter are formed with a pair of recesses 37 which are in alignment, each of these recesses being a segment of a sphere. These same inner faces of the endpieces 33 are also formed at the inner ends of the legs with another pair of recesses 38. The enlargement 35 is formed with a transversed passage 39 and positioned in this passage are a pair of ball detents 40 which are normally urged apart by an expansion coil spring 41 which is positioned in the passage 39 between the balls 40. This spring 41 serves to yieldably retain the balls 40 in either the recesses 38 or 37 but permits them to be removed from these recesses by the camming influence caused by relative movement of the base member 29 and crossbar 11.

Outstanding from the base member 29 are curved walls 42 that are separated by a slot 43 and which are joined at one end by the tubular construction 44. The outer exposed face of the base member 29 is formed with a longitudinal groove, the curve of which blends in with that of the inner faces of the side walls 42 and the bore of the tubular construction 44 to provide a cylindrical socket 45 which slidably receives an extensible arm 46. This extensible arm 46 is of cylindrical construction and at one end carries a key 47 that is adapted to be received in the slot 43 to prevent relative rotation between the arm 46 and the base member 29.

The inner end of the slot 43 is closed and is thereby constituted a stop that is engaged by the key 47 to limit outward movement of the arm 46.

At the end of the arm 46 remote from that which carries the key 47 and substantially in alignment with this key is an outwardly extending shaft 48 that has one end screwed into the arm 46. The free end of this shaft 48 is formed with a wrench engaging socket shown at 49. Rotatably mounted on this shaft 48 is an operating member or sleeve 50 which is adapted to be comfortably engaged by the fingers of an operator.

Beyond the tubular construction at 44, the walls 42 at their outermost extremity are cut away to provide one leg 51 of a keyhole slot, the other leg being formed by cutting away one of the side walls 42 as shown at 52. The operating member 50 is adapted to move in the two legs 51 and 52 of this keyhole slot with the transition from one leg to the other being accomplished by rotation of the arm 46.

Operation

In outlining the operation of the winding crank above described, it will be assumed that the crank is to remain in position on the side of the camera C during those periods when the latter is used. Thus, the plug 20 will have a driving fit in a socket formed in the winding element of the camera C. With the base member 29 "snapped in" relative to the crossbar 11, the inner face of the base member 29 engages the head 24 so as to move the latter inwardly into the recess 17 and thereby affect the pin 22 to break the connection between the ratchet elements 14 and 18. The base member 29 will be yieldably held in this "snapped in" position by the reception of the ball detents 40 in the recesses 38. In this position, the camera may be operated in the usual manner and rotation of the winding element within the camera will not effect the crossbar 11 or any of the mechanism carried thereby.

In this position of nonuse, the extensible arm 46 will be completely retracted within the bore 45 of the base member 29 and the operating member 50 is positioned in the leg 52 of the keyhole slot. This holds the extensible arm 46 in its retracted position and the operating member 50 is so located that it does not project outwardly in an objectional manner.

When the crank is needed to wind the spring of the camera C, the base member 29 is first "snapped out." This means the ball detents 40 come out of the recesses 38 and ride over the inner faces of the endpieces 33 until they are seated in the recesses 37. The latter engagement yieldably maintains the base member 29 in its "snapped out" position.

As will be seen from Figure 2, this snapping out of the base member 29 releases the head 24 so that the spring 25 urges the ratchet elements 14 and 18 into effective engagement.

The operating member 50 is now swung outwardly, which action is accompanied by rotation of the arm 46. This rotating movement is continued until the inner end of the operating member 50 engages the edge of the wall 42 opposite to the leg 52. This brings the operating member 50 into alignment with the leg 51 of the keyhole slot and at the same time the key 47 aligns with the slot 43. The arm 46 is now moved longitudinally in the bore 45 and in a radially outward direction until the key 47 enters the slot 43 and reaches the closed end of this slot. The operating member is now extended outwardly and the extensible arm is fully extended. It may now be used by the operator to wind up the spring of the camera C. While it is possible to wind up this spring by continuously rotating the operating member in the required direction, greater convenience in the winding operation may be had due to the presence of the ratchet teeth 15 and 19. The operating member may be moved through any desired angular distance and then quickly retracted over the same distance without effecting the winding action because the teeth 15 and 19 will slide over one another in this so-called backward rotation.

When the crank is not to be used it may be quickly collapsed by moving the arm 46 inwardly in the socket 45 until the operating member 50 comes opposite the leg 52. It is then swung over into this slot and the base member 29 snapped into its inner position which breaks the connection of the ratchet elements.

While a preferred specific embodiment of the invention is hereinbefore set forth, it is to be clearly understood that the invention is not to be limited to the exact constructions, mechanisms, and devices illustrated and described because various modifications of these details may be provided in putting the invention into practice within the purview of the appended claims.

What is claimed is:

1. In a winding crank for winding the spring of a movie camera, the combination of: a crossbar, a plug adapted to be drivably fitted in a socket formed in the winding element of said camera, driving connections between said plug and crossbar, and an extensible arm pivotally mounted on said crossbar and arranged in a position overlapping and substantially in alignment with said crossbar.

2. In a winding crank for winding the spring of a movie camera, the combination of: a crossbar, a plug adapted to be drivably fitted in a socket formed in the winding element of said camera, driving connections between said plug and crossbar, an extensible arm pivotally mounted at one end of said crossbar, said extensible arm being arranged substantially in alignment with and overlapping said crossbar, and cooperating means on said extensible arm and the other end of said crossbar for limiting relative movement therebetween.

3. In a winding crank for winding the spring of a movie camera, the combination of: a crossbar, a plug adapted to be drivably fitted in a socket formed in the winding element of said camera, driving connections between said plug and crossbar, an extensible arm pivotally mounted on said crossbar, said extensible arm being arranged substantially in alignment with and overlapping said crossbar, and cooperating elements of a yieldable detent on said crossbar and arm respectively for yieldably holding said arm in either of two positions relative to said crossbar.

4. In a winding crank for movie cameras including a spring that is adapted to be wound by rotation of a winding element, the combination of: a crossbar, a plug adapted to be drivably fitted in a socket formed in said winding element, operative connections between said plug and crossbar including separable ratchet elements, an extensible arm pivotally mounted on said crossbar, and means to affect said ratchet elements in one position to separate said elements and break the driving connection between said plug and crossbar.

5. In a winding crank for movie cameras including a spring that is adapted to be wound by rotation of a winding element, the combination of: a crossbar, a plug adapted to be drivably fitted in a socket formed in said winding element, a ratchet element carried by said crossbar centrally thereof and formed with an axial passage, a complemental ratchet element carried by said plug, a pin carried by said last-mentioned ratchet element and extending through said passage with its end normally projecting beyond the outer face of said crossbar, and an extensible arm pivotally mounted on said crossbar and adapted to engage the projecting end of said pin to break the driving connection between said ratchet elements.

6. In a winding crank for movie cameras including a spring that is adapted to be wound by rotation of a winding element, the combination of: a crossbar, a plug adapted to be drivably fitted in a socket formed in said winding element, a ratchet element carried by said crossbar centrally thereof and having ratchet teeth on its outer end and formed with an axial passage terminating in a counterbore at its inner end, said counterbore opening onto the outer face of said crossbar, a complemental ratchet element carried by said plug, a pin on said last-mentioned ratchet element extending through said passage and having a head received in said counterbore, an expansion spring in said counterbore engaging said head and normally urging said ratchet elements into effective engagement, and an extensible arm pivotally mounted on said crossbar and adapted to engage said head to break the connection between said ratchet elements.

7. In a winding crank of the character described, the combination of: a crossbar, and an extensible arm pivotally mounted on said end of said crossbar, said extensible arm including a base member overlying said crossbar and a member slidably mounted thereon which when extended assumes a position substantially in alignment with said crossbar.

8. In a winding crank of the character described, the combination of: a crossbar, an extensible arm comprising a base member having a cylindrical socket, said base member overlying said crossbar, and an arm slidably received in said socket and when extended assuming a position substantially in alignment with said crossbar, and a pivotal connection between one end of said crossbar and one end of said base member.

9. In a winding crank of the character described, the combination of: a crossbar, an extensible arm comprising a base member having a cylindrical socket and an arm slidably received in said socket, a pivotal connection between one end of said crossbar and one end of said base member, and cooperating means on the other ends of said crossbar and base member respectively for limiting relative pivotal movement therebetween.

10. In a winding crank of the character described, the combination of: a crossbar, an extensible arm comprising a base member having a cylindrical socket and an arm slidably received in said socket, a pivotal connection between one end of said crossbar and one end of said base member, cooperating means on the other ends of said crossbar and base member respectively for limiting relative pivotal movement therebetween, and cooperating elements of a yieldable detent on said crossbar and base member respectively for yieldably holding said base member in either of two positions relative to said crossbar.

11. In a winding crank of the character described, the combination of: a base member having an outer face formed with a longitudinally extending groove, side walls extending outwardly from said base member and having inner faces blending in with the curvature of said groove to provide a cylindrical socket having a slot at one end thereof, said side walls being formed with a keyhole slot at the end remote from said slot, a cylindrical arm slidably and rotatably received in said socket, a key on one end of said arm adapted to be received in said slot, and an operating member on the other end of said arm adapted to move in said keyhole slot and be received in one leg thereof.

12. In a winding crank of the character described, the combination of: a crossbar, means for operatively connecting said crossbar to the winding element of a movie camera, an extensible arm pivotally mounted at one end of said crossbar and assuming an effective position overlapping said crossbar and substantially in alignment therewith, said extensible arm including a base member and an extensible member slidably and rotatably carried by said base member, and cooperating elements of a yieldable detent on said base member and crossbar respectively for yieldably holding said base member in either of two positions relative to said crossbar.

13. In a winding crank of the character described, the combination of: a crossbar, means for operatively connecting said crossbar to the winding element of a movie camera, and including separable ratchet elements, an extensible arm pivotally mounted at one end of said crossbar, said extensible arm including a base member and an extensible member slidably and rotatably carried by said base member, and cooperating elements of a yieldable detent on said base member and crossbar respectively for yieldably holding said base member in either of two positions relative to said crossbar, said base member being adapted in one position to maintain said ratchet elements separated and thereby render said operating means ineffective.

ALFRED WILLIAM CHRIST.

REFERENCES CITED

The following references are of record in the file of this patent:

UNITED STATES PATENTS

| Number | Name | Date |
|---|---|---|
| 250,165 | Palmer | Nov. 29, 1881 |
| 1,115,652 | Clarke | Nov. 3, 1914 |
| 1,330,260 | Graham | Feb. 10, 1920 |
| 1,557,073 | McWhirter | Oct. 13, 1925 |
| 2,108,554 | Berg | Feb. 15, 1938 |
| 2,412,331 | Green | Dec. 10, 1946 |
| 2,455,819 | Smith | Dec. 7, 1948 |
| 2,490,947 | Coffing | Dec. 19, 1949 |

FOREIGN PATENTS

| Number | Country | Date |
|---|---|---|
| 511,063 | Germany | Aug. 1, 1929 |